United States Patent [19]

Balyasny et al.

[11] Patent Number: 4,627,561
[45] Date of Patent: Dec. 9, 1986

[54] FIBER OPTIC TERMINUS CLEAVING APPARATUS

[75] Inventors: Marik Balyasny, Van Nuys; Kenneth B. Baldwin, Newbury Park; William E. Lovell, Los Angeles, all of Calif.

[73] Assignee: G&H Technology, Inc., Santa Monica, Calif.

[21] Appl. No.: 796,703

[22] Filed: Nov. 12, 1985

[51] Int. Cl.$^4$ ............................................. C03B 37/16
[52] U.S. Cl. ....................................... 225/96; 225/2; 225/101; 225/106
[58] Field of Search .................. 225/2, 96, 96.5, 101, 225/106

[56] References Cited

U.S. PATENT DOCUMENTS

| | | | |
|---|---|---|---|
| 4,249,305 | 2/1981 | Basile | 225/96.5 X |
| 4,483,584 | 11/1984 | Gresty | 350/96.21 |
| 4,530,452 | 7/1985 | Balyasny et al. | 225/96 |

FOREIGN PATENT DOCUMENTS 2046242  11/1980  United Kingdom .................. 225/96

Primary Examiner—Frank T. Yost
Attorney, Agent, or Firm—George J. Netter

[57] ABSTRACT

A bare optical fiber is located within the interstice of three cylindrical pins with the fiber end extending outwardly of the contact assembly. The contact is located within an axial opening of a rotatable drum member with the bare optical fiber end extending outwardly. The drum member is interconnected via bearings to an outer rotatable portion of the drum member. A pretensioning clamp is arranged to receive the bare end of the fiber to secure it between clamp heads which applies an axial tension to the bare fiber with respect to the contact. A cutter blade mounted on the rotatable portion of the drum is adjustable to move a knife edge angularly toward the bear fiber to contact the bare fiber at a point closely adjacent the contact pin ends. Rotation of the outer portion of the drum member scores the fiber, as desired.

12 Claims, 11 Drawing Figures

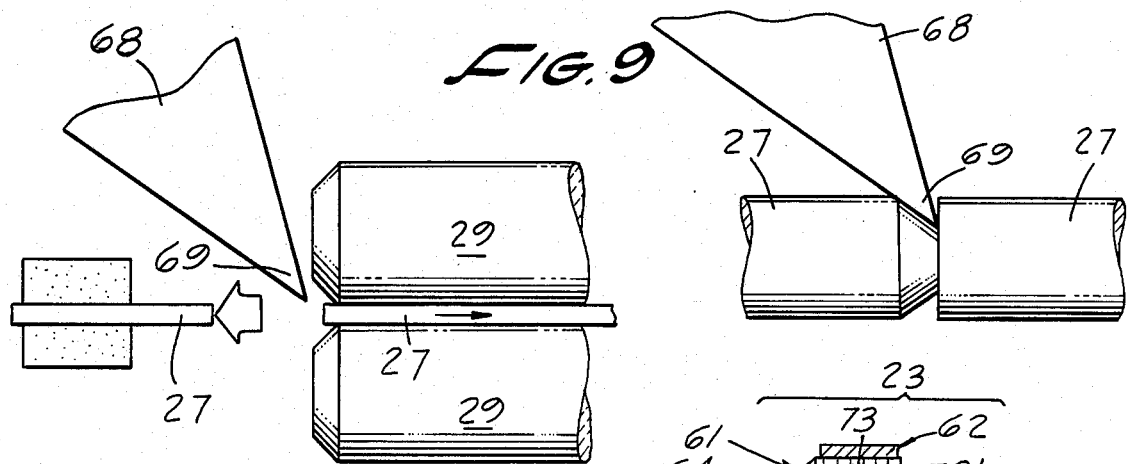
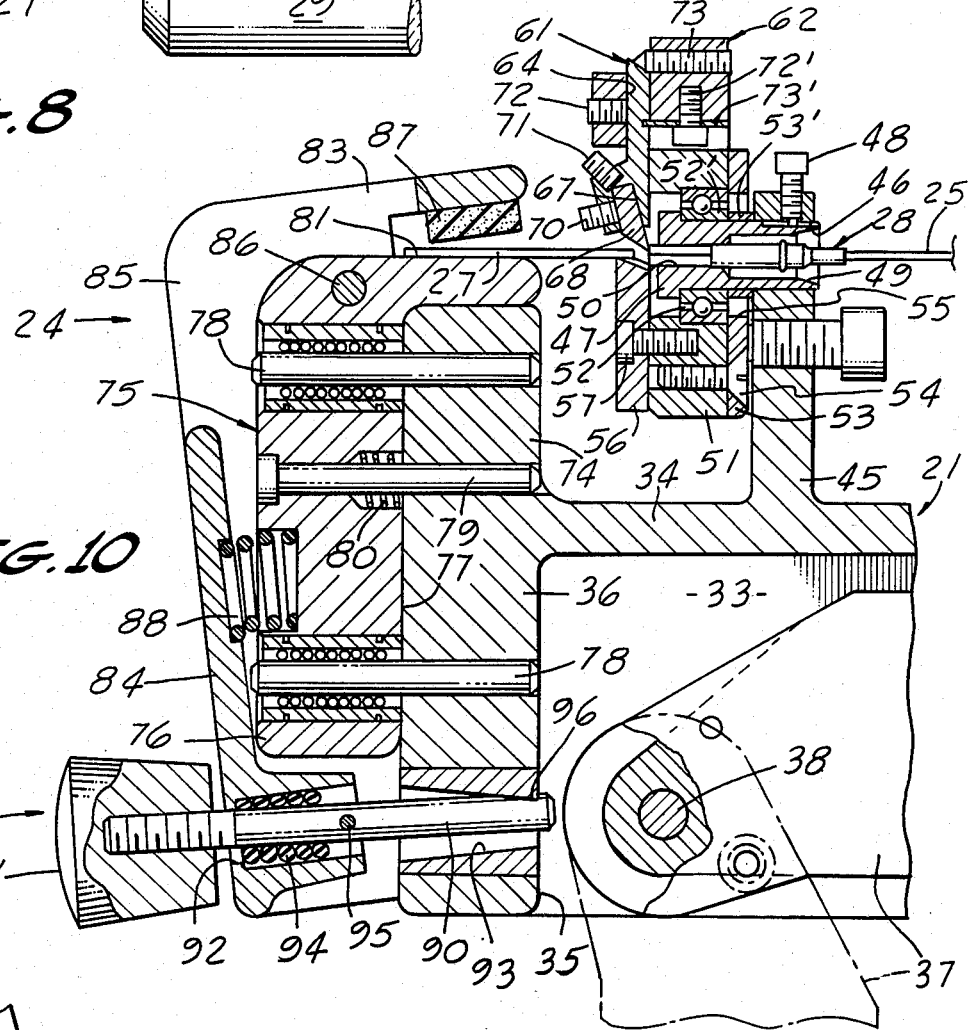
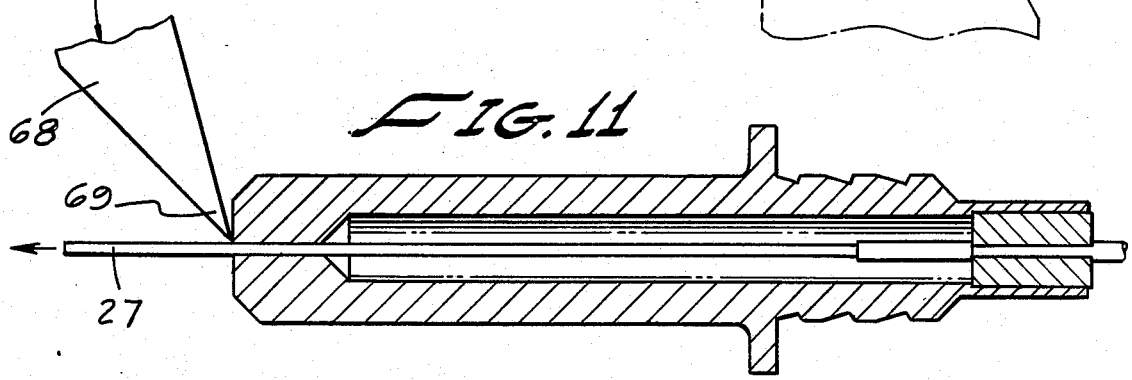

FIBER OPTIC TERMINUS CLEAVING APPARATUS

The present invention relates generally to apparatus for cleaving an optical fiber, and more particularly to such cleaving apparatus for facing off the end of a fiber mounted within a retaining contact at a point recessed within the contact parts a predetermined amount.

BACKGROUND OF THE INVENTION

Optical fibers constructed of plastic or glass are being increasingly relied upon for the transfer of light signals. There are many situations in which an optical fiber becomes broken and it is not practical to replace the entire fiber so it is necessary to effect a connection between the broken ends.

One technique for effecting connection between two fibers or between the ends of a broken fiber is that disclosed in U.S. Pat. No. 4,483,584 to John Gresty. According to this patented technique, the cladding and buffer are removed from the end portions of the fibers to be innerconnected leaving an extent of bare fiber. A contact consisting of three cylindrical pins arranged with their peripheral surfaces in contact with each other form an interstice within which the bare fiber is held. A three-pin contact of this kind holds the fiber in the desired manner without producing undesirable torque on or compressing the bare fiber to any significant extent. Portions of the contact are crimped on the fiber cladding immediately adjacent the bare fiber portion which secures the fiber against longitudinal movement within the contact.

In mounting the fibers within the contact a necessary preliminary step is to face off the end of the fibers at very precisely 90 degrees to the longitudinal axis of the fiber and locate the facedoff end slightly recessed from the three-pin contact ends. A pair of the fibers arranged in a corresponding set of contacts are then located in an alignment bushing with the ends of the two sets of pins in contact with each other which locates the two facedoff fibers in a slightly spaced relation. Arranging the faced-off ends of two fibers slightly spaced and aligned is considered essential to achieve the optimum in signal transmission across the junction without risking undesirable torquing or stressing of the fibers.

It has become accepted practice in the past to face-off a fiber prior to mounting within a contact which necessitated handling the cleaved fiber in a very careful manner to prevent it becoming broken or the very precisely cleaved off end face from being damaged in some way and thereby reducing or totally impairing the ability to transmit an optical signal.

U.S. Pat. No. 4,530,452, to M. Balyasny and W. Lovell, assigned to the same asignee as this application, discloses an excellent technique and apparatus for cleaving an optical fiber within a three-pin contact. Although this application discloses a fully satisfactory cleaving technique, it still leaves the cleaved fiber subject to possible damage during subsequent assembly into a contact.

SUMMARY OF THE DISCLOSURE

It is a primary aim and object of the present invention to provide apparatus for cleaving a fiber assembled within a three-pin contact at a point recessed a slight predetermined amount from the outer ends of the pins. Initially, an optical fiber has an end portion stripped of its cladding and buffer leaving it bare after which it is located within the interstice of three cylindrical pins with the bare end of the fiber extending substantially beyond the outer ends of the pins and the contact assembly generally. The contact with included fiber is located within an axial opening of a rotatable drum member with the bare optical fiber end extending substantially from one face of the drum and the remainder of the contact assembly and clad optical fiber extending from the other face. The drum member is interconnected via bearings to an outer rotatable portion of the drum member. That is, the contact and included fiber are secured within an inner member such that the outer portion of the drum member can be rotated with respect to the contact and fiber. A pretensioning clamp is arranged to receive the bare end of the fiber to secure it between clamp heads which applies an axial tension to the bare fiber with respect to the contact.

A cutter blade mounted on the rotatable portion of the drum is adjustable to move a knife edge angularly toward the bare fiber to contact the bare fiber at a point recessed from the outer ends of the pins holding the fiber within the contact. Rotation of the outer portion of the drum member produces via the knife edge a circumferentially extending score line about the bare fiber. Most frequently upon the completing the complete circumferential scoring of the fiber it will break at the point producing a faced off end face that is precisely 90 degrees to the fiber longitudinal axis. Moreover, the faced off end will be spaced between below or recessed back from the outermost ends of the pins holding the fiber within the contact.

The fiber pretensioning clamp includes an actuator enabling opening of the clamping jaws and maintaining them in an open condition automatically while locating the bare end of the fiber within the clamping jaws. Then manipulation of the actuator effects gripping and spring-loading pretensioning of the fiber.

DESCRIPTION OF THE DRAWING

FIG. 8 shows schematically the "jump" produced on breaking a fiber after scoring.

FIG. 9 shows in greatly enlarged depiction a production of a beveled score line from which a precise end face is obtained.

FIG. 10 is a side elevational, sectional view showing the fiber pretensioning clamping means in open condition for removal of a cleaved fiber end.

FIG. 11 shows the application of the cleaving apparatus of the present invention to a concentric type of fiber contact.

DESCRIPTION OF PREFERRED EMBODIMENTS

Figure 1:
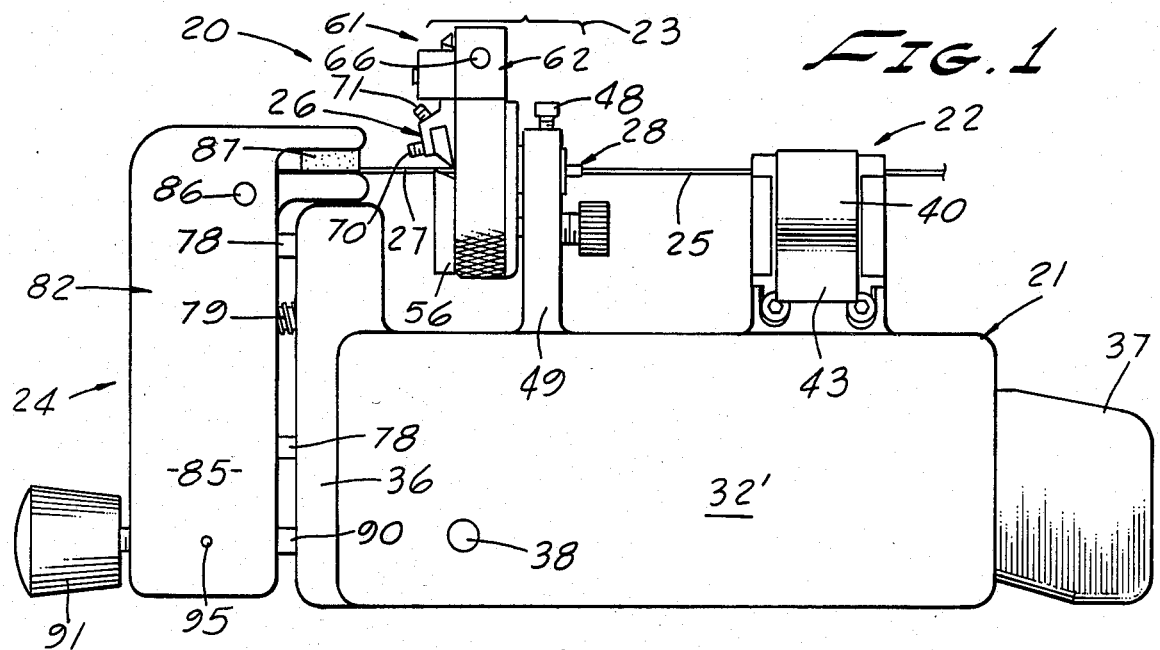
FIG. 1 is a side elevational view of the cleaving apparatus of the invention.
Figure 2:
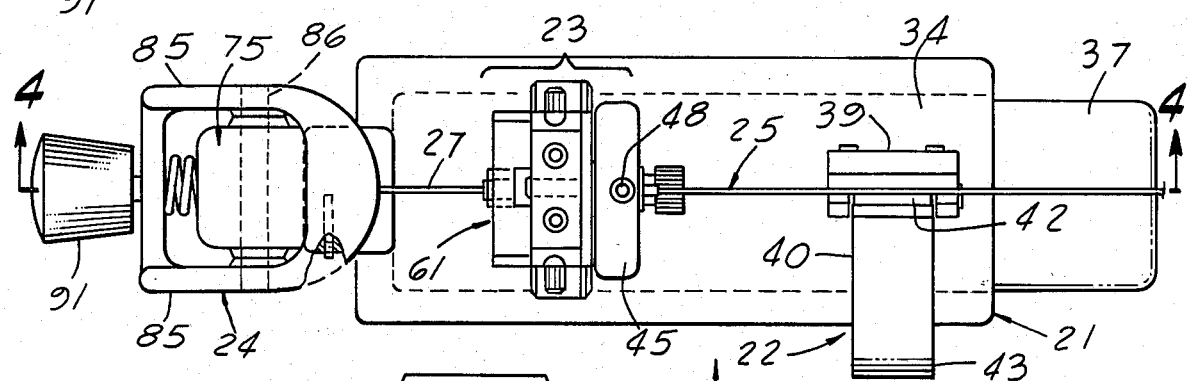
FIG. 2 is a top elevational view of the aparatus of FIG. 1.

Turning now to the drawing and particularly FIG. 1 the fiber cleaving apparatus of the present invention is identified generally as at 20. In its major elements, the apparatus includes an elongate base 21, a fiber holding means 22, a fiber contact retention and fiber scoring means 23, and a selectively actuatable fiber pretensioning device 24. The fiber contact holder 22, fiber contact retention and scoring means 23 and pretensioning device 24 are all mounted on the common base 21 so as to form a unitary arrangement thereby making the fiber cleaving apparatus of this invention easily adaptable for use either in the field or in the laboratory.

As to operation generally, the apparatus as shown in FIG. 1 receives an optical fiber 25 having a bare end portion mounted within a contact (e.g., three-pin contact), the bare fiber end extending from the contact is placed intension by the pretensioning means 24. Rotation of a ringlike portion of the means 23 causes a knife edge 26 to produce a scoreline of predetermined character extending circumferentially about the fiber and along which the fiber is cleaved. More particularly, the cleavage of the fiber is precisely at 90 degrees to the fiber longitudinal axis and at a point recessed a predetermined amount from the outermost end of the fiber contact.

Figure 6:
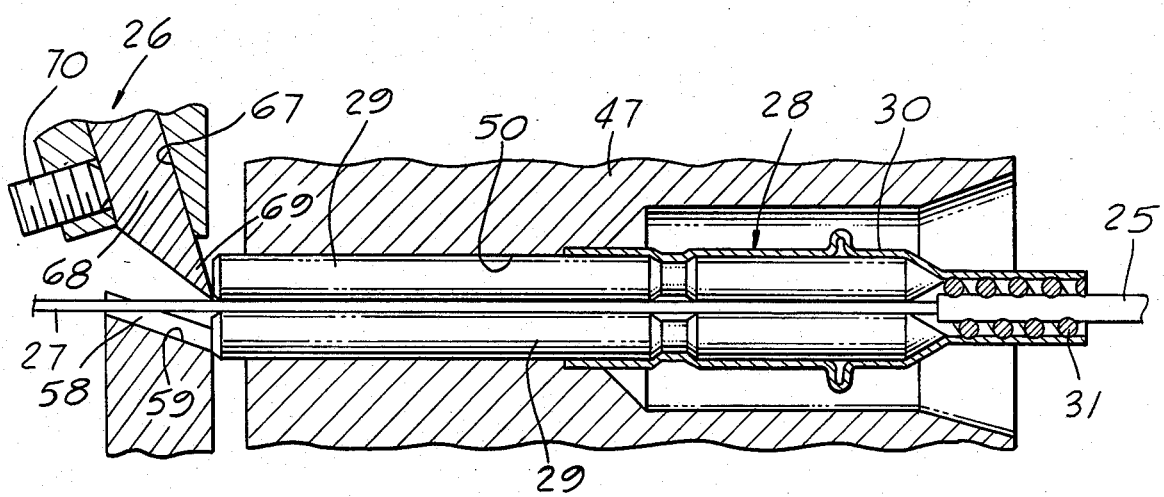
FIG. 6 is a side elevational, sectional, partially fragmentary, enlarged view showing the scoring of the fiber contained within a contact.
Figure 7:
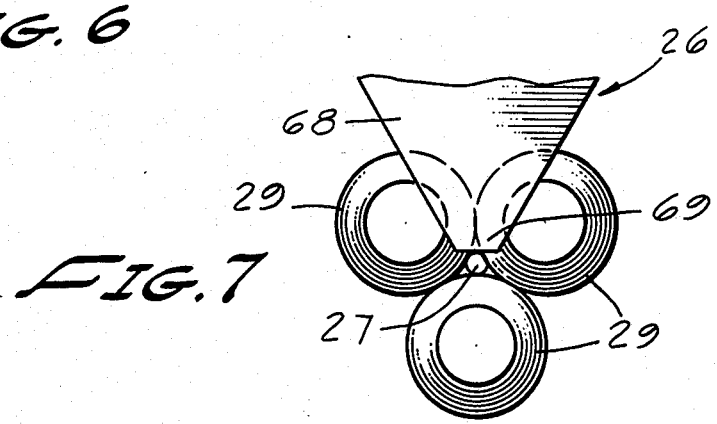
FIG. 7 is an end elevational view looking into the end of a contact assembly with included fiber and showing a knife edge in scoring position.

As shown best in FIG. 6, the optical fiber 25 has the cladding and buffer coating removed from an end portion leaving exposed a bare fiber portion 27. The contact illustrated generally as at 28 is the same as that disclosed in the referenced Gresty patent and includes three identically dimensioned cylindrical pins 29 which when maintained in a surface contacting relation have an interstice of such dimensions as to receive the bare fiber 27 therewithin. A deformable tubular shell 30 is crimped onto the pins 29 and included bare fiber 27 holding it into a unitary relation and as well includes a helical spring member 31 which bites into the fiber cladding thereby securing the fiber against longitudinal movement with respect to the contact 28. When appropriately mounted in the contact for the practice of the present invention, there is a length of the bare fiber extending outwardly beyond the ends of the contact pins 29.

BASE CONSTRUCTION

Figure 3:
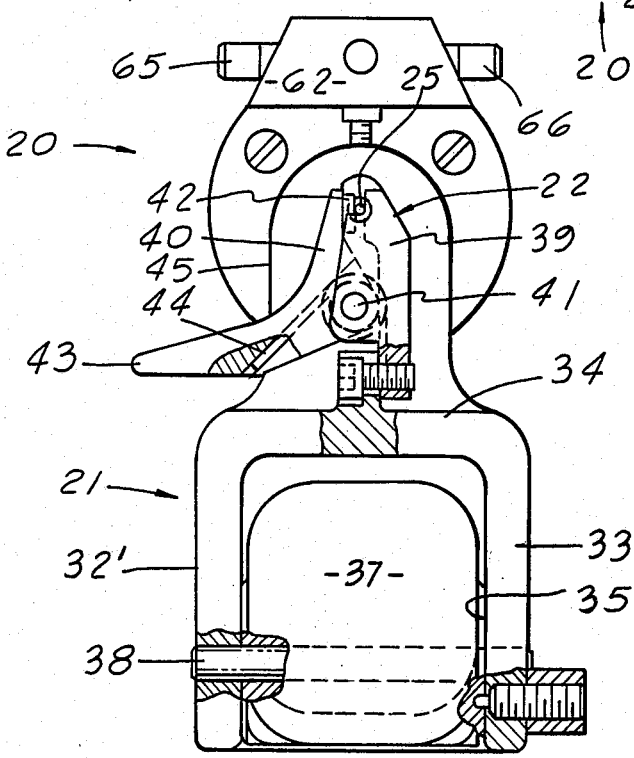
FIG. 3 is a end elevational view of the apparatus in FIGS. 1 and 2.
Figure 4:
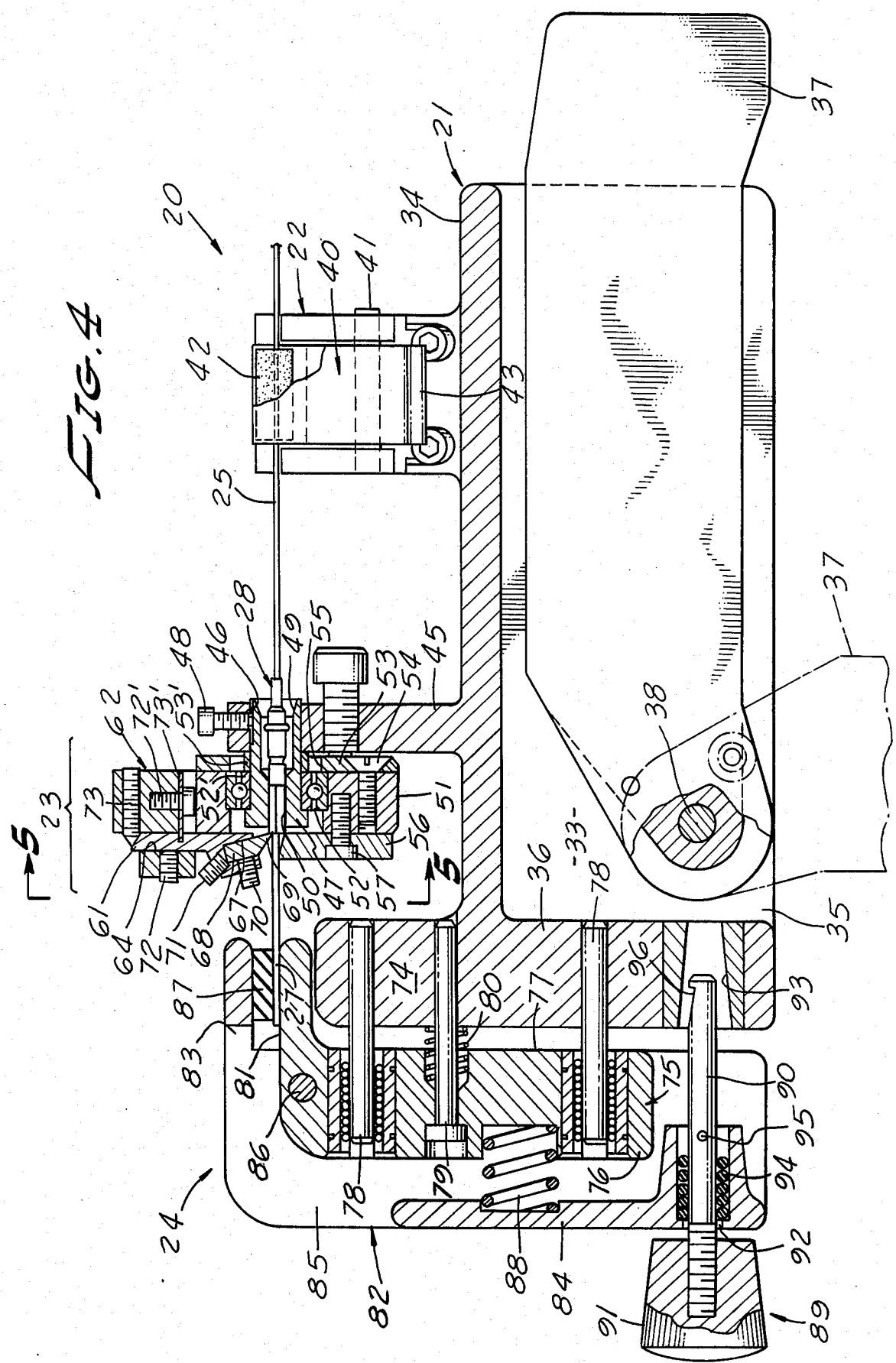
FIG. 4 is a side elevational sectional view taken along the line 4—4 of FIG. 2.

With simultaneous reference to FIGS. 1, 3 and 4 it is seen that the base consists of a generally U-shaped housing 32 has two side walls 32' and 33 interconnected by a top wall 34 with an open bottom 35. Also, as seen best in FIG. 4, the base has one closed end wall as at 36 and the opposite end wall open.

An elongated arm or handle 37 has an end rotatably secured as at 38 within the cavity of the base formed between the base side and top walls The handle 37 can be swung out to extend downwardly at as much as 90 degrees, or, alternatively, folded out of the way within the base. This construction of the base makes the entire cleaving apparatus readily adaptable for use at the laboratory bench, at a microscope, or in the field.

Fiber Holding Means

The fiber holding means 22 includes first and second clamping jaws 39 and 40 having facing surfaces for engaging the optical fiber over its buffer and cladding securely holding the same substantially parallel to the base top wall 34. As shown in FIG. 3, the first clamping jaw 39 is an upstanding member affixed to the base top wall which includes an L-shaped surface for receiving the fiber along an integral corner thereof. A second jaw 40 pivotally mounted to the first jaw 39 at 41 has a gripping surface 42 which is directly opposite the L-shaped surface of the first jaw. An arm 43 integral with the second jaw extends outwardly away from the pivot 41 and is manipulable to move the gripping surface 42 toward or away from the first jaw L-shaped surface. A spring 44 resiliently urges the two jaws to the closed position.

In use, the arm 43 is moved downwardly separating the first and second jaws. The fiber is then placed along the internal corner of the first jaw L-shaped surface. Release of the arm allows the spring to move the gripping surface 42 into contact with the fiber, clamping it against the first jaw.

Fiber Contact Retention and Scoring Means

Referring primarily to FIGS. 4 and 6, it is seen that the means identified generally as 23 securely holds a contact 28 mounted onto an optical fiber 25 with a bare fiber portion 27 extending forwardly. Moreover, while the fiber contact is so held, the bare fiber is scored completely about its periphery at a point slightly inwardly of the contact pins 29 ends, and the fiber is cleaved along the score line providing a fiber end face that is smooth and precisely at 90 degress to the fiber longitudinal axis.

As to constructional details, an upstanding wall member 45 has an opening 46 extending therethrough which is in general alignment with the L-shaped inside corner of the fiber holding means 22 first clamping jaw 39. Preferably, the wall member 45 is constructed integrally with the base 21.

A cylindrical member 47 fits into the opening 46 and is secured against rotation by a machine screw 48. The member has an axial bore of a first diameter portion 49 substantially larger than the contact cross-section and a smaller diameter portion 50 fittingly receiving the set of pins 29. A cylindrical rotor 51 is rotatably mounted onto the end portion of the cylindrical member 47 by means of a bearing race 52. An enlarged head on member 47 forms a shoulder against which the race 52 abuts and an internal shoulder on the rotor 51 also holds an edge of the race. A circular plate 53 secured to the side of the rotor 51 facing wall member 45 by machine screw 54 bears against the outer race 52 and spacer 53' holds the inner race 52' in place. An oversize central opening 55 in plate 53 allows the cylindrical member 47 to pass freely through the plate without impeding rotation of the rotor.

Figure 5:
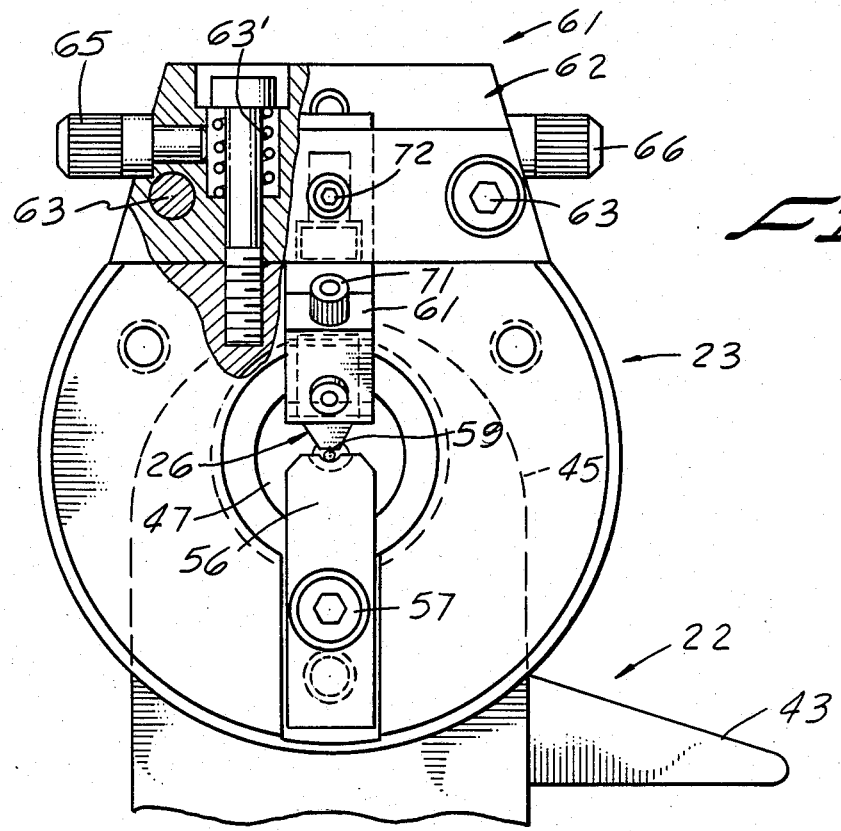
FIG. 5 is an end elevational sectional view taken along the line 5—5 of FIG. 4.

Simultaneous reference is now made to both FIGS. 4 and 5 for the ensuing description of the apparatus details for scoring the bare fiber. A generally rectangular support plate 56 is secured to the outer face of the rotor 51 by a threaded member 57. The upper edge of the plate is beveled downwardly from its outer face to its inner face adjacent the rotor and is enumerated 58, as seen best in FIG. 6. The middle portion of the plate upper edge has a groove 59 (FIG. 5) which aligns with the interstice of the contact pins 29 guiding the bare fiber 27 onto the support surface 81 of the pretensioning device 24 and thereby avoid abutting against the leading edge of the support surface (FIG. 4).

A scoring means holder 61 is held securely and fixedly against the rotor outer face directly opposite to and spaced from the support plate 56 by a bracket 62. More particularly, the bracket is affixed to the rotor 51 by bolt means 63 (FIG. 5) and has a slot 64 (FIG. 4) for receiving an end portion of holder 61. Knobs 65 and 66 are each received on the ends of stub shafts which are mounted into opposite sides of the bracket 62 and serve as means for pulling bracket 62 with knife blade 68 away from the fiber while the contact and fiber is being inserted into the drum. The springs 63' maintain constant pressure on the knife blade toward the fiber during scribing.

A parallel-sided slot 67 formed in the inner or lower edge of holder 61 fittingly receives a knife blade 68 therein with the cutting edge 69 extending outwardly toward the bare fiber 27. Specifically, the slot 67 parallel sides extend angularly with respect to the rotor front such that the knife blade is adjustably positionable along a plane that angularly intersects the fiber longitudinal axis.

A first threaded member 70 bears against the knife blade side to fix the blade within slot 67 at any position of adjustment and a second threaded member 71 has an inner end which bears against the inner edge of the knife blade (FIG. 5). That is, adjustment of the blade outward extension is accomplished by loosening threaded member 70, threading member 71 in or out as desired while holding the knife blade edge against it, and then retightening member 70 to secure the knife blade at its new adjustment.

The blade cutting edge 69 is beveled on one side only, namely, on the side opposite the rotor. In this way, precise and repeatable adjustment of the cutting can be made for achieving fiber scoring at a point recessed from the contact end a distance preferably amounting to only several ten thousandths of an inch.

In addition to the knife blade adjustment just described, the holder 61 can be moved along the rotor outer face by loosening screw 72 and 73, moving the holder as described, and tightening screws 73 and 72, in that order. Flat spring 73' is held by screw 72' and tensioned downwardly. If upward adjustment of knife blade 68 is desired, the screw 73 is loosened which allows the spring force of spring 73' to move holder 61 upward. The combination of adjustments of the holder and knife blade effect proper location of the knife edge 69 in contact with a bare fiber 27 for scoring.

Pretensioning Device

The fiber pretensioning device 24 is similar in construction and operation to the clamping means 67 of the referenced Balyasny et al. patent in that it clamps onto the end portion of the bare fiber being cleaved and applies a predetermined amount of axial tension to the fiber. For the ensuing detailed description of the pretensioning device particular reference is made to FIGS. 4 and 10.

The base end wall 36 extends upwardly to form a further wall 74. A generally L-shaped transfer block 75 is constructed to fit onto the upstanding wall 74 and end wall 36. More particularly, the transfer block has one arm 76 with an internal face 77 of dimensions and geometry identical to the outer surfaces of 74 and 36. Three transverse openings are formed in 76 accommodating two guide pins 78 and a third pin 79 with a large head limiting the travel of block 75. There are three openings in walls 74 and 36 which align, respectively, with the openings in 76 for receiving the ends of pins 78 and 79. Compression spring 80 moves the transfer block 75 outwardly from walls 74 and 36 applying tension to the fiber.

The upwardly directed support surface of the transfer block horizontal arm is substantially flat and coplanar with the groove 59 in plate 56.

Preferably, the pins 78 and 79 are slidingly received within the openings in 76 and tightly held in the walls 36 and 74. In this manner, the transfer block is movable solely along a path toward and away from walls 36, 74. The large head of the pin 79 serves as a limit stop in a way that will be described.

A fiber retention means 82 consists generally of an L-shaped member, one arm 83 of which is adapted to extend over the support surface 81 of the transfer block, and the other arm 84 extends generally parallel to the outside surface of the block 76. A pair of side plates 85 integral with the arms of 82 partially enclose the sides of the L-shaped member and include a pivot pin 86 passing therethrough which is rotatably received within the upper portion of the block 76. A holding pad 87 is affixed to the inner end surface of arm 83 and is located immediately opposite the outer end portion of the flat support area 81 of the transfer block (FIGS. 4 and 10). A compression spring 88 has one end received within a declivity in the inner surfae of the L-shaped arm 82 with the other spring end received in a similarly shaped declivity in the outside surface of the transfer block 76 (FIG. 4). In this way, the spring 88 acts to resiliently urge the fiber holding pad 87 in contact with the flat support surface 81. It is also to be noted that when the vertical arm of 82 is depressed towards transfer block 76, the movement of the block 76 toward vertical arm of 82 is limited by contact of the two.

At the lower end of the vertical arm of L-shaped member 82 is a selectively actuatable means 89 for maintaining the pad 87 spaced apart from surface 81 during the initial location of a fiber in the apparatus for cleaving. The means 89 includes a cylindrical shaft 90 with a knob 91 at one end. The shaft extends through an oversize opening 92 in the vertical arm of 82 and into a conical opening 93 in end wall 36. Rubber or elastomeric O-rings 94 received on shaft 90 coacts with the wall of 82 and a pin 95 fixed to the shaft to provide resilient mounting of the means 89. When the member 82 is pressed toward wall 36 a hook 96 on the shaft 90 locks behind end wall 36 holding pad 87 away from surface 81. Pressing knob 91 with slight lateral movement releases the means 89. This pressing and lateral movement should be made slowly to allow fiber clamp pad 87 to clamp onto the fiber and place it in tension.

Use of The Described Embodiment

The fiber 25 having its protective buffer covering removed from an extensive end portion 27 has a contact 28 appropriately mounted onto the bare fiber leaving a bare fiber portion extending outwardly of the contact. Next, the pad 87 is locked open by pressing L-shaped member 82 toward the end wall 36 (FIG. 10). The bare fiber end portion is then threaded through the retention and scoring device 23 and allowed to rest on surface 81 with the contact 28 properly located within the opening 50 in cylindrical member 47. Now, the fiber holding means 22 is clamped onto the fiber and the pretensioning device knob 91 is pressed to effect gripping and tensioning of the fiber. Finally, rotation of the scoring apparatus 23 scores the fiber which on breaking at the score line produces the desired faced-off fiber end surface.

The actual scoring achieved is shown in detail in FIGS. 8 and 9. As can be seen best in FIG. 9, the knife blade 68 is maintained at an angle to the ends of the contact pins 29 which allows the score line to be made almost exactly in the plane of the ends of the pins or even slightly recessed from the pin ends. At the completion of scoring and breaking of the fiber along the score line, the fiber tension is released and the newly cleaved fiber end will "jump" some distance d and be located recessed within the ends of the contact pins as desired.

Even where a fiber contact construction other than the three-pin one described, the present invention can be advantageously employed. In FIG. 11 a contact is shown having the bare fiber extending through an opening in the contact end wall, the end wall having a flat outer surface. In this since the knife edge 68 is held at an angle to the contact end surface a scoreline can be made on the fiber at a point very close to the outer end of the contact body. Moreover, due to fiber pretensioning or the fiber breaking at the scoreline, the fiber end will jump to a recessed position as desired.

I claim

1. Apparatus for cleaving the end portion of an optical fiber extending from a contact within which it is held such that the cleaved fiber end is located slightly recessed within the contact, comprising:

a base;

selectively releasable fiber holding means mounted on the base;

fiber pretensioning means mounted on the base for clampingly engaging the fiber end portion and placing it in tension along the fiber longitudinal axis; and fiber scoring means mounted on the base intermediate said holding means and said pretensioning means including;

rotor means having a bore extending therethrough, the bore axis coinciding with the rotational axis of said rotor means, means for supporting the contact within the rotor means bore in a fixed predetermined position, and knife blade means mounted to rotate with said rotor means and having a knife edge means for contacting the fiber end portion at the point at which said fiber end portion leaves the contact for scoring the fiber on rotor rotation.

2. Apparatus for cleaving an optical fiber as in claim 1, in which the knife blade means is mounted in a plane that intersects the fiber end portion at an angle less than 90 degrees.

3. Apparatus for cleaving an optical fiber as in claim 2, in which the knife blade means has a knife edge with a flat side facing the contact and a beveled side opposite thereto.

4. Apparatus for cleaving an optical fiber as in claim 2, in which the knife blade means is adjustable along the plane and normal to the fiber end portion.

5. Apparatus for cleaving an optical fiber as in claim 1, in which the pretensioning means includes first and second jaw means selectively actuatable to clamp onto the fiber end portion and pull on the fiber simultaneously.

6. Apparatus for cleaving an optical fiber as in claim 5, in which the pretensioning means includes a locking means for maintaining the first and second jaw means in spaced apart relation.

7. Apparatus for leaving an optical fiber as in claim 1, in which the fiber scoring means includes a cylindrical member fixedly mounted on the base and having a bore configured for fittingly receiving a contact with fiber therein, the rotor means being journaled to the cylindrical member for rotation thereabout, and the knife blade means being adjustably secured to an outer surface of said rotor means.

8. Apparatus for cleaving an optical fiber as in claim 7, in which the knife blade means is mounted in a plane that intersects the fiber end portion at an angle less than 90 degrees.

9. Apparatus for cleaving an optical fiber as in claim 8, in which the knife blade means has a knife edge with a flat side facing the contact and a beveled side opposite thereto.

10. Apparatus for cleaving an optical fiber as in claim 8, in which the knife blade means is adjustable along the plane and normal to the fiber end portion.

11. Apparatus for cleaving an optical fiber as in claim 7, in which the pretensioning means includes first and second jaw means selectively actuatable to clamp onto the fiber end portion and pull on the fiber simultaneously.

12. Apparatus for cleaving optical fiber as in claim 11, in which the pretensioning means includes a locking means for maintaining the first and second jaw means in spaced apart relation.

* * * * *